March 3, 1942.  R. J. OLANDER  2,274,846
CAR CONSTRUCTION
Filed Oct. 24, 1939
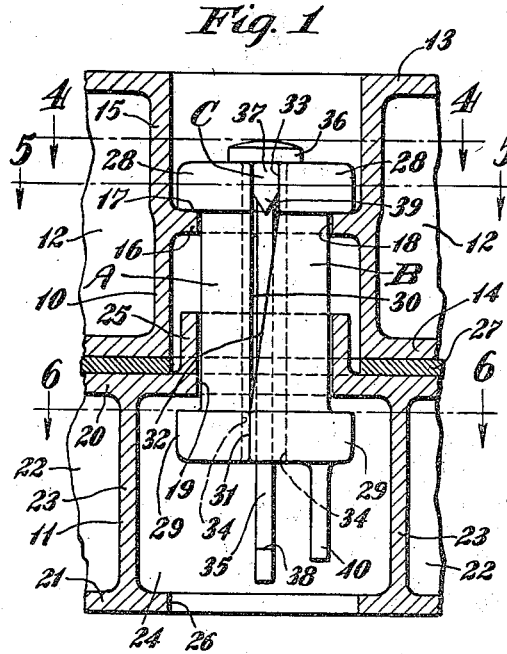
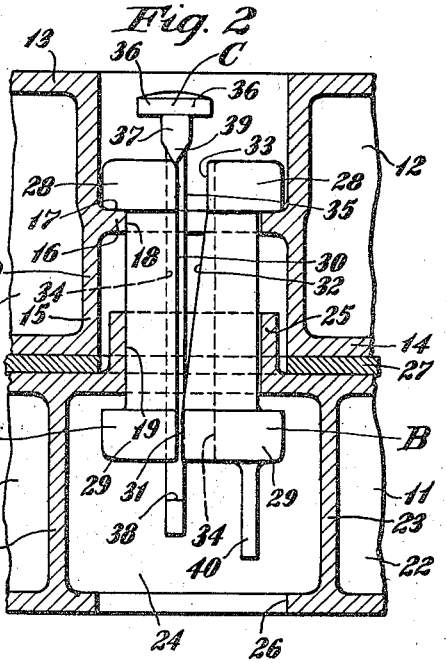
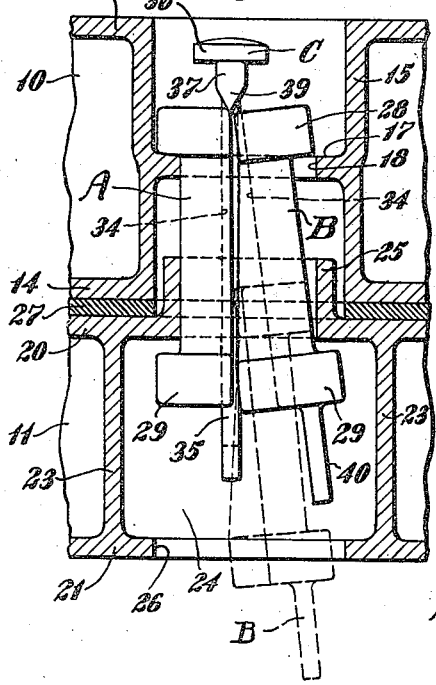
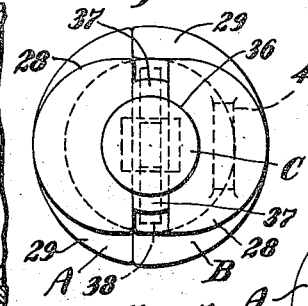
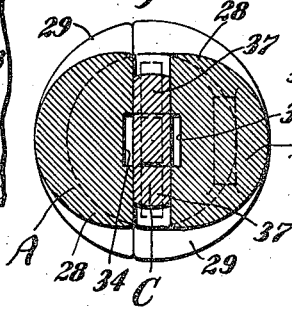
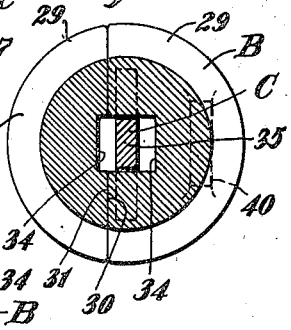
Inventor
Roland J. Olander
By Henry Fuchs.
Atty.

Patented Mar. 3, 1942

2,274,846

UNITED STATES PATENT OFFICE 2,274,846

CAR CONSTRUCTION

Roland J. Olander, Chicago, Ill., assignor to W. H. Miner, Inc., Chicago, Ill., a corporation of Delaware Application October 24, 1939, Serial No. 301,008

6 Claims. (Cl. 105—200)

This invention relates to improvements in car construction.

One object of my invention is to provide an improved car construction, particularly for railway cars having the usual body and truck bolsters connected by a center pin, wherein the pin is composed of sections which may be readily inserted from underneath the truck bolster and locked in shouldered engagement with the bolsters of the car.

Another object of the invention is to provide in a structure of the character set forth in the preceding paragraph, a sectional pin composed of outer members having shouldered engagement with the bolsters of the car to secure said pin against endwise removal, and a central spreader element between said outer members to hold the latter separated and in said shouldered engagement, wherein the spreader element is applied from beneath the truck bolster and is held against removal in downward direction by shouldered engagement with the tops of the outer members, and is displaceable when desired, to provide clearance to allow removal of one of said outer members, thus rendering the remaining parts of the pin removable.

A still further object of the invention is to provide a center pin of the character indicated, composed of two outer members and a central filler element, wherein the parts of the pin are so designed that the same may be readily connected with and locked to the bolsters of the car by application of the parts thereof in succession, and removed by withdrawal thereof in succession, the parts being held in locking relation with the bolsters by the spreader element which may be readily manipulated from beneath the truck bolster to bring the same to spreading position and also to displace the same from said position to permit contraction of the pin as a whole to allow removal thereof from the bolsters by withdrawal of the parts in succession from beneath the truck bolster.

Still another object of the invention is to provide a center pin composed of two outer members headed at opposite ends and a central filler element adapted to hold the upper end portions of said outer members separated, all insertable in the center pin openings of the bolsters of a railway car from beneath the truck bolster, while the car body including the body bolster is assembled with the complete truck bolster, wherein the inner sides of said outer members are in abutment at their lower ends and diverge toward the upper ends to provide, when said filler element is displaced from said holding position, clearance for lateral adjustment of the upper end of one of said members with respect to the other to clear the head at the upper end of the latter from shouldered engagement with the body bolster so that said headed upper end will pass freely through the center pin receiving openings, thereby allowing removal of said member by withdrawal in a downward direction.

A more specific object of the invention is to provide a center pin as set forth in the preceding paragraph, wherein a portion of the filler element engages between the diverging inner sides of the outer members to hold the upper ends of the latter separated and in shouldered engagement with the body bolster, and is upwardly displaceable to remove said portion from beneath said members to permit collapse of the upper end of the pin to permit removal of the entire pin by successive withdrawal of the parts thereof.

Other objects of the invention will more clearly appear from the description and claims hereinafter following.

In the drawing forming a part of this specification, Figure 1 is a vertical sectional view taken lengthwise of the car through the mid portions of the body and truck bolsters of the underframe structure, illustrating my improvements in connection therewith, the center pin being shown in elevation. Figure 2 is a view similar to Figure 1 showing the filler or spreader element of the pin displaced to permit collapse of the pin. Figure 3 is a view similar to Figure 2 showing the upper end of the pin contracted to position one of the outer members thereof for withdrawal from the openings of the bolsters, said last named member being also shown in partly withdrawn position, in dotted lines. Figures 4, 5, and 6 are horizontal sectional views, corresponding respectively to the lines 4—4, 5—5, and 6—6 of Figure 1.

In said drawing, 10 indicates the body bolster of the car and 11 the truck bolster. The body bolster is of the cast type and has diaphragm sections 12—12, top and bottom walls 13 and 14, and a center section 15 to accommodate the center pin. The section 15 is of cylindrical, tubular form, as shown, and has an annular, inwardly projecting flange 16 between the top and bottom ends, thereby providing an annular shoulder 17. The opening 18 defined by this flange is circular in form and of slightly greater diameter than the shank of the center pin.

The truck bolster 11, which is also preferably a casting, has top and bottom walls 20 and 21, connecting side webs 22—22, and spaced vertical walls 23—23. The spaced walls 23—23 define a pocket 24 therebetween which serves to accommodate the bottom head of the center pin connecting the bolsters. The top wall of the truck bolster is provided with an upstanding hollow boss in the form of an annular flange 25 which projects into and is accommodated within the lower end of the tubular center section 15 of the body bolster 10. The opening 19 defined by the flange 25 is in axial alignment with, and corresponds in diameter to, the opening 18 provided by the flange 16 of the tubular section 15 of the bolster 10. The bottom wall 21 of the bolster 11 at the pocket 24 is provided with an opening 26 which is axially aligned with the opening 19, but of somewhat greater diameter than said last named opening. The usual bearing plate or shim 27 is interposed between the body and truck bolsters.

The body bolster is interlocked with the truck bolster by my improved locking pin which comprises broadly a pair of outer sections A and B and a central filler or spreader element C.

The two outer members A and B are of the same design, except as hereinafter pointed out. Each outer member is of substantially semi-cylindrical cross section and is provided at the top thereof with an eccentric, substantially semi-cylindrical, outstanding flange 28, and with a concentric, substantially cylindrical, outstanding flange 29 at the bottom end thereof. As will be evident, the flanges 28 and 29 form top and bottom head members of the members A and B.

The inner side of the member A presents a substantially flat face 30 which is vertically disposed, while the inner side of the member B is provided with a relatively short, vertical, flat face 31 at its lower end and is cut away above said face 31, as shown in Figures 1 and 2 to present an elongated flat face 32 which is inclined away from the face 30 of the inner side of the member A and extends approximately to the flange 28 at the upper end of said member B, where the inner side presents a substantially flat, vertical face 33.

The inner side of each outer member is vertically grooved or slotted from end to end, as indicated by 34. The groove 34 is of angular cross section, as shown in Figures 5 and 6. The two grooves 34—34 of the members A and B of the pin form a central bore of substantially square cross section.

The spreader or filler element C comprises a shank portion 35 of substantially rectangular cross section, a head 36 at the upper end of said shank, diametrically opposite, laterally projecting wings 37—37 on said shank below said head, and a cross member 38 at its lower end forming a T-shaped end portion. The element C is of greater length than the outer members A and B of the pin and has the head 36 thereof resting on top of the members A and B when the parts are in completely assembled relation attached to the bolsters. As shown in Figures 1 and 5, the wings 37—37 are of such a thickness that they fill the space between the outer members A and B at the upper end of the pin and hold said members expanded. The shank 35 of the element C is of slightly lesser width than the groove 34 of either of said outer members so that it may be moved up and down and displaced laterally in said grooves. As will be seen upon reference to Figure 6, the thickness of the shank 35 is such that the element C may be displaced laterally in the bore of the pin to a considerable extent. As shown in Figures 1, 2, and 3, the lower edges of the wings 37—37 may be beveled off to provide a relatively sharp wedge-shaped end portion 39 to facilitate entering said wings between the upper end portions of the outer members A and B and lifting of the element C when the outer members are pressed together by squeezing out said wedge-shaped lower edge portions.

As will be evident upon reference to Figure 1, when the center pin, comprising the outer members A and B and the filler element C interposed between said members, is in applied position with respect to the body and truck bolsters, the cylindrical shank of the pin substantially fits the openings 18 and 19 of said bolsters, and the flanges 28—28 and 29—29 at the top and bottom ends of said members form top and bottom head portions respectively, which hold the pin against removal from the bolsters, the flanges 28—28 overlapping the annular shoulder 17 provided by the flange 16 of the body bolster and the flanges 29—29 cooperating with the shoulder presented by the top wall of the pocket of the bolster 11 to restrict upward movement of the pin. As will be further evident upon reference to Figure 1, the outer members A and B of the pin abut at their lower ends and are held separated or spread apart at their upper ends by the interposed wings 37—37 of the filler element C.

To facilitate removal of the section B, the same is provided with a depending tongue 40 which forms a hand or finger grip. As will be evident the member B may be rocked from the position shown in Figure 2 to the full line position shown in Figure 3 by manipulating the finger piece or extension 40. This finger piece may also be employed to withdraw the member B from the pin receiving openings of the bolsters.

The eccentric flanges 28—28 at the top ends of the members A and B are of such a size that they will pass freely through the pin receiving openings of both the body and truck bolsters when the filler element is not in the spreading position, that is, the top head of the outer member B is of such a size and outside contour that it will pass freely downwardly and upwardly through the pin receiving openings when the filler element is in the disengaged position shown in Figure 3 and the outer member A is in the position shown in said figure. The top head of the outer member A is of such a size that it will pass freely through the openings of the bolsters when the outer member B and the filler element C are not present.

In removing the center pin, the filler element C is first pushed upwardly until the wings 37—37 are completely withdrawn from between the members A and B and clear the top ends of said outer members. The filler element is then displaced to the left approximately to the position shown in Figure 2. The upper end of the pin is then collapsed by tilting the member B, as indicated in the full line position in Figure 3, thereby bringing the head 28 of said member into registration with the pin receiving openings of the bolsters. This tilting of the member B is produced by manipulating the projecting finger 40. The member B is then withdrawn downwardly through said openings as shown in dotted lines in Figure 3. The filler element C and the outer member A may now be withdrawn in succession.

In applying the pin, the operation is substantially the reverse of that just described, the outer member A being first inserted in the bolster openings by passing the same upwardly through the opening of the truck bolster. The member A is then displaced laterally to engage the top and bottom heads thereof with the shoulders of the bolsters as seen in Figure 3. The filler element C is next inserted and positioned as shown in said last named figure. The outer member B is then inserted from beneath the truck bolster, as indicated in dotted lines, and after being completely inserted is rocked to the position shown in Figure 2. Then the filler element is pulled downwardly, the wedge-shaped lower edges of the wings 37—37 guiding the latter to registering position with respect to the opening between the outer members of the pin. When the filler element has been moved downwardly to an extent to seat the head 36 on the upper end of the pin, the wings 37—37 will be brought to the interposed position shown in Figure 1, to hold the outer members spread apart and in shouldered engagement with the bolsters.

I have herein shown and described what I now consider the preferred manner of carrying out my invention, but the same is merely illustrative and I contemplate all changes and modifications that come within the scope of the claims appended hereto.

I claim:

1. In car construction, the combination with body and truck bolsters having aligned center pin receiving openings; of a locking center pin insertable from beneath the truck bolster, said pin including elongated outer members having retaining flanges at opposite ends; a spreader element between said members for holding the same spread apart with the flanges thereof in shouldered engagement with the bolsters, said spreader element comprising a shank of greater length than said outer members, said shank being headed at the upper end for shouldered engagement with the upper extremities of said outer members, said head being of a size to pass upwardly through the openings of said bolsters when one of said outer members of the pin is absent; and oppositely projecting wings on said shank below said head, said head being adapted to be supported by said outer members with the wings of said element engaged between said outer members to hold the latter spread apart, said element being upwardly displaceable to disengage said wings from between said outer members to permit collapse of the pin and downward withdrawal from said openings of one of said outer members, said spreader element, and the other outer member in succession.

2. In a car construction, the combination with body and truck bolsters having aligned center pin receiving openings; of a sectional locking center pin comprising a central spreader element, an outer member at one side of said element and a second outer member at the opposite side of said element, said outer members being headed at their top and bottom ends for shouldered engagement with the bolsters, said first named member, spreader element, and second named member being removable from the bolster in succession, said outer members having upwardly diverging inner sides between which the spreader element engages to hold the outer members spread apart with the top heads thereof in shouldered engagement with the bolsters, said top head of the first named member being of a size to permit said head to pass through the pin receiving openings when the spreader element is disengaged from its spreading position and the pin is contracted at its top, said spreader element and second named member being successively removable when said first named member is absent, the top head of said second named member being of a size to pass freely through said pin receiving openings when the first named member is absent.

3. In a car construction, the combination with body and truck bolsters having aligned center pin receiving openings of circular cross-section; of a sectional locking center pin of cylindrical cross-section comprising an outer section headed at the top and bottom ends, said headed ends being in shouldered engagement with the bolsters; a spreader element having an elongated depending shank extending through said pin receiving openings; and a second outer member, said outer members embracing the shank of said spreader element, and said second named outer member having the top section thereof and the top head of a size and shape to pass through said openings when said first named member is in position in said openings and the spreader element is in non-spreading position with the shank thereof disposed within said openings.

4. In car construction, the combination with body and truck bolsters having aligned center pin receiving openings of circular cross-section and uniform diameter throughout their lengths; of a cylindrical center pin insertable from beneath said truck bolster, said pin including outer members headed at opposite ends, and a central spreader element between said outer members, said spreader element including a shank extending between said outer members and beyond the lower ends of the latter to provide a manipulating portion, clearance for lateral displacement of said shank being provided between the latter and said outer members, said spreader element being headed at the upper end for shouldered engagement with the upper extremities of said outer members to hold said element against withdrawal in a downward direction, said spreader element having locking wings thereon engageable between the upper ends of said members to hold said upper ends spread apart with the heads thereof in shouldered engagement with the bolsters, said wings being disengaged from between said outer members and lifted clear of the upper ends of the same by upward displacement of said spreader element through upward movement of said shank to permit collapsing of said upper end of the pin for removal from the bolster openings.

5. In car construction, the combination with body and truck bolsters having aligned center pin receiving openings of circular outline and of uniform diameter throughout their lengths; of a cylindrical center pin insertable from beneath said truck bolster, said pin including outer members headed at opposite ends, and a central spreader element between said outer members, said spreader element including a spreader portion for holding the pin expanded with the heads in shouldered engagement with the bolsters, a depending shank extending between and projecting beneath said outer members to permit manipulation from beneath said pin, said spreader portion being disengaged from between said outer members by upward movement of said shank, said shank being loosely embraced between said outer members to permit lateral displacement of said element with respect to said members when said spreader portion is disengaged from between said outer members to permit collapse of the upper end of the pin and provide clearance for withdrawal of one of said outer members in downward direction.

6. In car construction, the combination with body and truck bolsters having aligned center pin receiving openings; of a center pin insertable from beneath said truck bolster, said pin including outer members headed at opposite ends, and a central spreader element having a shank disposed between said outer members and depending below the outer members for manipulation; spreading projections on the upper end of said shank adapted to engage between said outer members to hold said members spread apart, said shank being longitudinally movable to engage said spreading projections between said outer members or disengage the same therefrom; and shouldered means at the upper end of said shank overhanging the upper ends of said members to hold said element against downward displacement when said spreading projections are engaged between said members, the opposed inner sides of said outer members being grooved to accommodate said shank for lateral displacement when said spreading projections are disengaged from between the same to permit collapse of said pin and thereby allow downward withdrawal of one of said outer members, said spreader element, and the other outer member successively.

ROLAND J. OLANDER.